United States Patent [19]

Yates, Jr. et al.

[11] Patent Number: 5,051,885

[45] Date of Patent: Sep. 24, 1991

[54] DATA PROCESSING SYSTEM FOR CONCURRENT DISPATCH OF INSTRUCTIONS TO MULTIPLE FUNCTIONAL UNITS

[75] Inventors: John S. Yates, Jr.; Stephen J. Ciavaglia, both of Nashua, N.H.; John Manton, Marlboro, Mass.; Michael Kahaiyan, East Bridgewater, Mass.; Richard G. Bahr, Cambridge, Mass.; Barry J. Flahive, Westford, Mass.

[73] Assignee: Hewlett-Packard Company, Palo Alto, Calif.

[21] Appl. No.: 255,105

[22] Filed: Oct. 7, 1988

[51] Int. Cl.[5] .................. G06F 9/28; G06F 9/302; G06F 12/04; G06F 15/16
[52] U.S. Cl. .................. 364/200; 364/247.6; 364/263; 364/262.9; 364/263.1; 364/262.4; 364/260; 364/254.9; 364/259.9; 364/259; 364/937.1; 364/937.8; 364/947; 364/948; 364/948.3; 364/948.34; 364/948.31; 364/946.2; 364/956; 364/961.1; 364/961.3; 364/969.1; 364/966
[58] Field of Search ... 364/200 MS File, 900 MS File

[56] References Cited

U.S. PATENT DOCUMENTS 4,926,323 5/1990 Baror .................. 364/200

Primary Examiner—Archie E. Williams, Jr.
Assistant Examiner—Eric Coleman
Attorney, Agent, or Firm—Richard F. Schuette

[57] ABSTRACT

Apparatus and method for concurrent dispatch of instruction words which selectively comprise instruction components which are separately and substantially simultaneously received by distinct floating point and integer functional units. The instruction words are powers of 2 in length, (measured in terms of the smallest machine addressable unit) typically a 4 byte longword and an 8 byte quadword aligned to the natural boundaries also corresponding to powers of 2. To provide maximum operating efficiency, each functional (or processing) unit executes a component of an instruction word during an execution cycle. The type and length of the instruction word are indicated by one of the bit fields of the instruction word, which permits the apparatus to properly detect, store and transfer the instruction word to the appropriate functional unit. The invention combines the encoding efficiency of variable length instruction combined combined with the enhanced processing speed of simultaneous operation of all available functional units, to provide the execution efficiency of systems with a single instruction length.

10 Claims, 3 Drawing Sheets

DATA PROCESSING SYSTEM FOR CONCURRENT DISPATCH OF INSTRUCTIONS TO MULTIPLE FUNCTIONAL UNITS

FIELD OF THE INVENTION

The present invention relates to computer processors, and in particular to variable length multi-function unit control.

BACKGROUND OF THE INVENTION

The design of central processing units (CPU) has typically included multiple functional units, such as floating point and integer processor units. Historically, the computer instructions have been organized and distributed to only one functional unit in any one instruction issue cycle. Horizontally multiprogrammed CPUs permit simultaneous and parallel operation of more than one functional unit every instruction issue cycle.

To provide simultaneous operation of multiple function units, the width of the instruction word increases to accommodate the multiple instruction components. However, as programs are unlikely to contain the operations necessary to maintain each functional unit busy for every execution cycle, the widened instruction stream will likely contain no-ops for most of the functional units.

While a variable length encoding of the instructions would address the problem of no-ops, the variable length encoding in high performance (pipelined) architectures increases the complexity of page-faults when the instructions are allowed to cross page boundaries, and the overall instruction cycle time may be adversely affected by the determination of the length of the current instruction so as to advance the program counter and initiate the next instruction cache.

Furthermore, the instruction stream parsing complexity may require the introduction of an additional pipeline stage to allow proper determination that an entire instruction is available for dispatch, and that an instruction pipeline stage may be introduced to ease the problem of read-ahead, which itself may result in additional page-fault complexities and latency in the presence of a taken branch instruction. Therefore, the general concept of variable length instruction encoding provides only limited enhancement of the efficiency of horizontally multiprogrammed machines, and also tends to self-limit as actual programs are executed by the multiple functional units.

SUMMARY OF THE INVENTION

The apparatus and method of the present invention provides for efficient concurrent dispatch of instructions to multiple functional units using a natural alignment restriction on the variable length components of the instruction stream. The instructions comprise only power of 2 multiples of the smallest instruction size, 4 bytes. The maximum length instruction word according to the present method and apparatus comprises distinct, statically positioned fields. Each field is directed to a respective individual decoder/controller that is associated with a functional unit. The format of the instruction comprises longword instructions of 4 bytes in length comprising only integer processor instructions. A second, quadword format includes a format having both integer and floating point unit instructions, as well as a format having two separate integer processor instructions. A bit field within the instruction word indicates the length and format of the instruction.

Each of the functional units includes a decoder/controller. When dispatching an instruction of less than the maximum possible length, some fields may be missing. The decoder/controller of each of the functional units independently determines if the field is missing, in which case that decoder/controller responds as though a no-op were present, dispatching no work to its associated functional unit. Apparatus according to the present invention includes an instruction cache having a width corresponding to the widest or longest possible instruction, assuring that an entire instruction will always be accessed in a single cache cycle. Instruction fetch cycles are classified as either those loading the program counter (PC) with a new, normally non-sequential value (transfer cycle) or a sequential cycle. The sequential instruction fetch cycles are classified as those which reference the same cache line as the previous cycle, and those that advance to the next cache line.

The PC comprises a high-order portion which indexes the cache and a low-order portion which identifies the appropriate starting point of the desired instruction within the addressed cache line. The higher-order portion of the PC can be unchanged, (bit 02) incremented by one (X4) for each cycle, or loaded with a new address. The upper PC is unchanged if during the sequential execution, the instruction currently being dispatched is a longword instruction fetched from the even side of the cache. The upper PC is incremented by one (X4) if, during sequential execution, the instruction being dispatched is a 32 bit instruction from the odd side of the cache, or is a quadword instruction. The upper PC is loaded with a new address as a result of a taken branch or call. The target address comprises a high-order and a low-order portion. If the current cycle neither transfers nor advances to the next cache line (not a new cache line cycle), then the output of the incrementer is ignored and the high-order PC remains unchanged, and the low-order PC is updated to reflect the length of the preceeding instruction. If the current cycle advances to the next cache line, then the output of the incrementer is loaded in the high-order PC while the low-order PC is reset to 0.

The instruction cache is followed by pre-fetch buffer which captures the potentially unconsumed portion of a fetch line. The pre-fetch buffer is as wide as the instruction cache minus the length of the shortest instruction format. The pre-fetch buffer is loaded from the output of the instruction cache during a new cache line cycle.

Each functional unit decoder/controller is connected to a multiplexer network that allows selection of the appropriate fields both directly from the live output of the instruction cache, and from the output of the pre-fetch buffer. During a new cache line cycle, the multiplexer selects the appropriate field from the live output of the instruction cache, effectively bypassing the pre-fetch buffer for one cycle. Alternately, the multiplexer selects the appropriate field from the output of the pre-fetch buffer.

Thus, the apparatus and method according to the present invention provides enhanced efficiency in the operation of a CPU having multiple functional units while reducing the restrictions and complexities imposed on the compiler to provide the necessary flow of instructions to the multiple functional units.

DESCRIPTION OF THE DRAWING

These and other features of the present invention will be better understood by reading the following detailed description of the invention, taken together with the drawing, wherein.

DETAILED DESCRIPTION OF THE INVENTION

Figure 1:
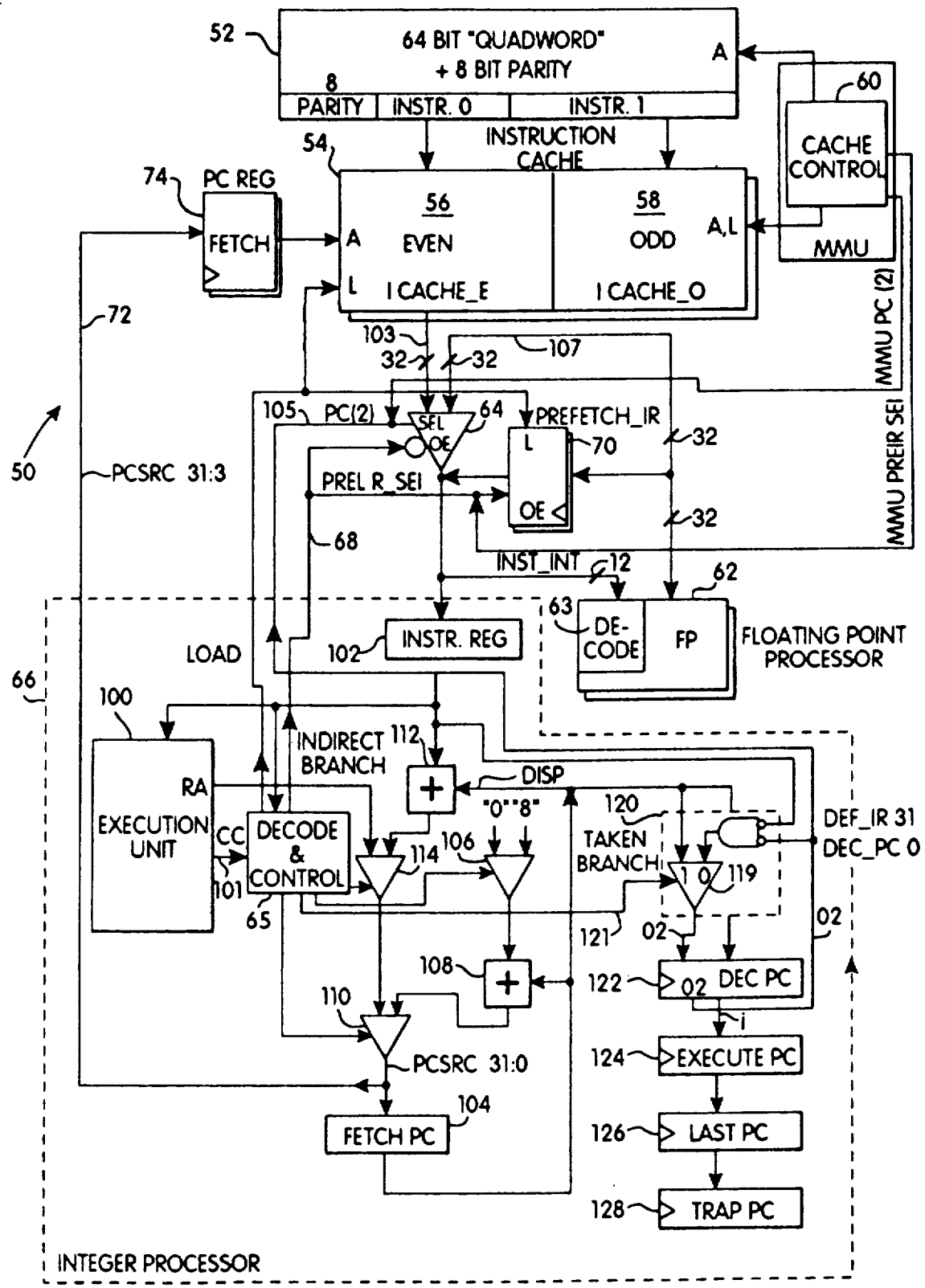
FIG. 1 is a block diagram of the instruction dispatch portion of a central processing unit according to one embodiment of the present invention.
Figure 2:
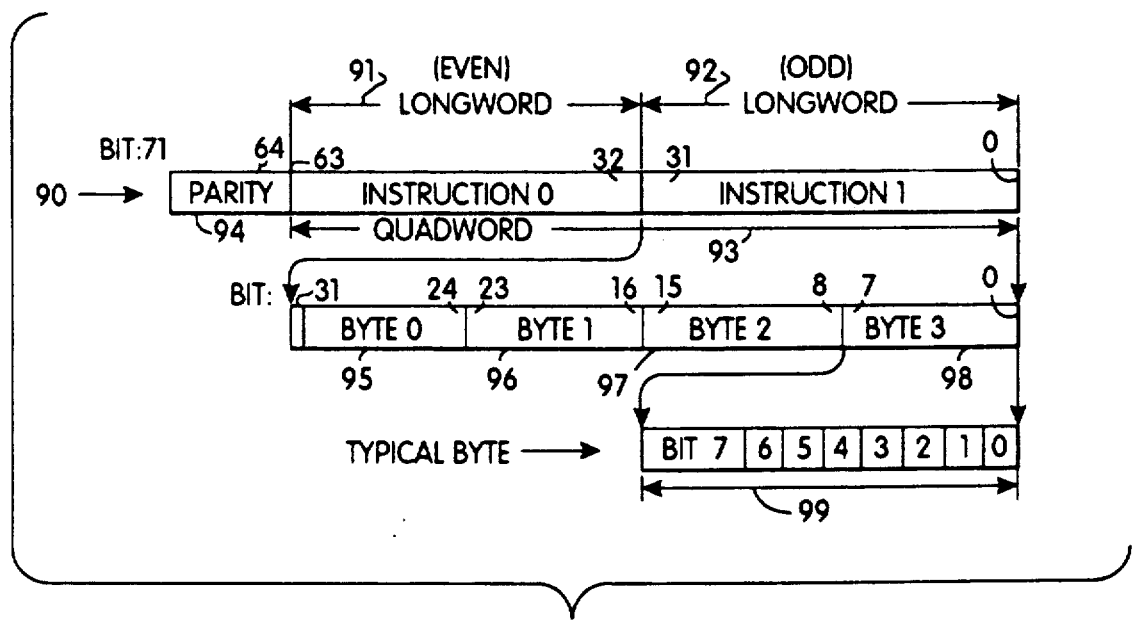
FIG. 2 is a chart defining the instruction format according to one embodiment of the present invention.

A block diagram 50 of the concurrent dispatch unit according to the present invention is shown in FIG. 1. Instruction data is received from a source, such as program memory 52 which comprises a 72 bit word consisting of 64 bits of instruction data and 8 bits of parity data as illustrated in FIG. 2, discussed below. The instructions provided by the source 52 are received and stored by an instruction cache 54 having an even and odd section 56 and 58 therein. Transfer of the instruction data from the source 52 to the cache 54 is controlled by a cache control element 60.

Each instruction stored in the exemplary cache 54 comprises a 64 bit message which comprises a single 64 bit quadword instruction 93 or two 32 bit longword instructions 91 and 92. The instructions 92 stored in the odd section 58 of the instruction cache 54 are received directly by the floating point processor 62. The instructions 91 stored in the even portion 56 of the instruction cache 54 are received by a multiplexer 64, which selectively provides either an instruction from the even 56 or odd 58 portion of the instruction cache 54 to the integer Processor 66 and FP processor 62. When an instruction is received from even section 56 by the integer processor 66, the instruction in odd section 58 is stored in a pre-fetch register 70. Since the subsequent instruction will be received by the integer processor 66 from the pre-fetch register 70, the program counter register 74 will be incremented by 0 rather than by 8, thereby inhibiting the transfer of new instructions to the instruction cache 54.

A more detailed view of the integer Processor 66 is also shown in FIG. 1 wherein the integer processor includes an instruction register 102 which receives a 32 bit instruction from the output of the multiplexer 64 or the output of the pre-fetch register 70, when enabled by the signal on lead 68. The instruction stored in the instruction register 102 is received by the execution unit 100, the decode and control logic unit 65, and other logic elements 112, 120. The address of this instruction is stored in the decode program counter 122. The address stored in the fetch program counter 104 results from a manipulation of the instruction in register 102. The manipulated is performed by a logic process dependant on the instruction itself, for instance, as previously discussed and illustrated by the tables 1–4 below. According to the present invention, 64 bit instructions are loaded into the instruction cache 54, corresponding to eight bytes of data, comprising eight bits per byte. Therefore, the PC fetch register 74 maintains the least significant bits, 00, 01, 02 at a logical value of 0, such that the instructions are received at address intervals of eight. In general, the instructions proceed through the integer processor 66 successively through the instruction register 102, the fetch program counter (fetch PC) 104, the program counter adjust logic 120, the decode program counter 122, the execution program counter 124, the last instruction program counter 126, and the trap program counter 128. Except for the third least significant bit, 02 of decode program counter 122, program counters 122, 124, 126 and 128 provide information for use elsewhere in the integer processor 66, not shown, to analyze the instruction status of present and previous instructions for other uses such as recovery from a trap or stall condition, as are known in the art.

If an even longword instruction is received from the instruction cache 54 on leads 103 through the multiplexer 64, the state of bit 31 (see FIG. 2 of the instruction stored in register 102 indicates that the instruction is a longword or longword instruction. The state of bit 02 is maintained from the instruction register 102 to the fetch program counter 104. The program counter adjust logic 120 selectively modifies only bit 02 of decode program counter (DEC PC) 122 in response to a taken branch signal 121 provided by the decode and control logic 65 which in turn responded to the instruction from instruction register 102. The taken branch signal on lead 121 serves to indicate whether the next instruction is a sequentially provided instruction or is the result of a taken branch, and controls the multiplexer 119. If a branch is taken, the condition of bit 02 of DEC PC 122 is maintained through the multiplexer 119. Except when a branch instruction is taken, if neither the instruction register bit 31 nor the program counter bit 02 is set, indicating that the next instruction to be read is the adjacent odd instruction from the instruction cache 54, the bit 02 is set in the decode program counter 122, indicating that the instruction decoded is arriving from the odd section 58 of the instruction cache 54 through the pre-fetch register 70, while the multiplexer 64 is disabled according to the signal on lead 68. The multiplexer 106 selects the numeric value of 0 which is added by adder 108 to the current value of the program counter 104 and in turn restored unchanged to the fetch program counter 104 by selection of the multiplexer 110. The state of the branch signal on lead 121 is determined by the decode a control unit 65 which uses a portion of the signal from the instruction register 102, as well as the condition code signal CC provided by the execution unit 100 on lead 101.

When a branch is made directly to an odd longword, the instruction is received from the odd section 58 of the instruction cache 54 on lead 107 through the multiplexer 64, when enabled by a signal on lead 68 and selected by the signal on lead 105. As discussed above, the signal on lead 105 is derived from bit 02 of the decode program counter 122 which is maintained by operation of the multiplexer 119. The address provided to the multiplexer 119 from the fetch program counter 104 may result from a direct branch resulting from the addition of the instruction value in the fetch program counter 104 added to the instruction provided by the instruction register 102 by the adder 112. The resulting address is selected by the multiplexer 114 under control of the decode and control logic 65, which also passes the signal at the output of adder 112 to the input of the fetch program counter 104 via multiplexer 110, wherein it is stored and forwarded on subsequent execution clock cycles. According to conditions determined by the decode and control logic 65 and the execution unit 100, an indirect branch may be taken, wherein the indirect branch address is provided from internal register RA (not shown) of the execution unit 100, and passed to the fetch program counter 104 through correspondingly enabled multiplexers 114 and 110.

The instruction data word 90 is illustrated in FIG. 2 which may selectively comprise two longword instructions 91 and 92 of 32 bits each, or a single 64 bit quadword 93. An 8 bit error detecting parity word 94 may be or has been appended to the 64 bits of instruction, which for simplicity, will be deleted from subsequent discussion of the instruction data. The longword 91 or 92 each comprises 4 bytes of data 95, 96, 97 and 98, wherein the most significant byte is byte 0. A typical byte 99 comprises 8 bits wherein bit 7 is the most significant bit. The format of this instruction corresponds to the Motorola 68000 data format, of which the corresponding data sheets are incorporated by reference.

The instruction lengths supported by the concurrent dispatch unit of the CPU according to the present invention comprise a 64 bit quadword aligned or 32 bit longword aligned instruction. Instructions are generically classified as either integer or floating point. Integer instruction types comprise integer register-to-register, branch and memory reference instructions. Floating point instruction types comprise floating point register-to-register instructions. The longword aligned instruction only comprises integer instruction types. The quadword aligned instruction format comprises an integer instruction in the even (most significant) longword half of the quadword instruction and a floating point instruction in the odd (least significant) longword half of the quadword instruction. For the longword form, the fetched instruction is sent to the integer processor. For the quadword form, the even (most significant) longword instruction is sent to the integer processor 66. The odd longword instruction is sent only to the floating point processor 62.

In addition to simultaneously transferring instructions to both the integer processor 66 and floating point processor 62 from a single instruction word in the instruction cache 54, the present invention also transfers select bits from the even sections 56 of the instruction cache to the floating point processor to provide control of the memory references to/from the floating point processor 62. The integer processor 66 makes quadword references to the instruction cache 54. External pre-fetch buffer 70 is used to hold the odd longword in the event two integer instructions fall on an aligned quadword boundary. As an instruction is being fetched from the instruction cache, the integer processor specifies the next fetch address via signals on lead 72, which comprises a 29 bit PC SRC data bus for addressing the instruction cache 54.

A multiplexer 64 connected to the integer processor 66 is used exclusively for selectively fetching an instruction from either the even or odd section of the instruction cache 54. The odd section 58 may be selected only during the fetch of a taken branch target. The pre-fetch IR select signal on lead 68 is used to select the instruction from the cache 54 or the pre-fetch register 70. The pre-fetch register 70 is selected when the prior instruction dispatch was a quadword aligned 32-bit instruction and the current fetch is not due to a taken branch target. The pre-fetch select signal also signals the memory management unit (MMU), including the cache control 60, that the integer processor is not referencing the instruction cache in the current cycle and therefore inhibits the generation of a cache miss or exception relative to the current fetch. The pre-fetch register 70 and the external program counter are normally loaded provided that the integer processor 66 or floating point processor 62 is not signaling a fetch stall. The pre-fetch register select signal on lead 68 and the multiplex 64 control are normally supplied by the integer processor 66. However, during an instruction cache miss event, the memory management unit (MMU), including cache control 60, is responsible for supplying these controls with the returning miss instruction provided that the memory management unit PCSRC busy signal is asserted.

Detailed state Tables 1, 2, 3 and 4 below, illustrate the integer processor hardware requirement.

TABLE 1

Sequential Instruction Fetch Requirements:

| IR | LW Alignment | Decode_PC | Fetch_PC | Next Fetch_PC | Next Decode_PC | Next* IR | Fetch Request |
|---|---|---|---|---|---|---|---|
| 32-bit Int | even | i | i + 8 | Fet_PC + 0 | Dec_PC + 1 | Pre_IR | disable |
|  | odd | i | i + 4 | Fet_PC + 8 | Fet_PC | icache_e | enable |
| 32-bit Int/FP | even | i | i + 8 | Fet_PC + 8 | Fet_PC | icache_e | enable | note:
Next Fetch_PC(2) will equal '0' for all above cases

TABLE 2

Call Instruction Fetch Requirements:

| IR | LW Alignment | Decode_PC | Fetch_PC | Next Fetch_PC | Return Address | Next Decode_PC | Next* IR | Fetch Request |
|---|---|---|---|---|---|---|---|---|
| 32-bit Call | even |  |  |  |  |  |  |  |
| 32-bit shadow | odd | i | i + 8 |  | i + 8 | Dec_PC + 1 | Pre_IR | disable |
| taken target | even |  |  |  |  |  |  |  |
|  | odd |  |  | target |  |  |  |  |
| 32-bit Call | odd |  |  |  |  |  |  |  |
| 32-bit shadow | even | i | i + 4 |  | i + 8 | Fet_PC | icache_e | enable |
| taken target | even |  |  |  |  |  |  |  |
|  | odd |  |  | target |  |  |  |  |
| 64-bit Call | even |  |  |  |  |  |  |  |
| 32-bit shadow | even | i | i + 8 |  | i + 12 | Fet_PC | icache_e | enable |
| taken target | even |  |  |  |  |  |  |  |

TABLE 2-continued

| | | | | Call Instruction Fetch Requirements: | | | | |
|---|---|---|---|---|---|---|---|---|
| IR | LW Alignment | Decode_PC | Fetch_PC | Next Fetch_PC | Return Address | Next Decode_PC | Next* IR | Fetch Request |
| | odd | | | target | | | | |

*Assumes Fetch_PC is 'not' a branch target

TABLE 3

| | | | | Branch Instruction Fetch Requirements: | | | | |
|---|---|---|---|---|---|---|---|---|
| IR | LW Alignment | Decode_PC | Fetch_PC | Next Fetch_PC | Next Fetch_PC(2) | Next Decode_PC | Next* IR | Fetch Request |
| 32-bit branch | even | | | | | | | |
| 32-bit shadow | odd | i | i + 8 | | | Dec_PC + 4 | Pre_IR | disable |
| not taken target | even | | | Fet_PC + 0 | 0 | | | |
| taken target | even | | | | 0 | | | |
| | odd | i | i + 8 | target | 1 | | | |
| 32-bit branch | odd | | | | | | | |
| 32-bit shadow | even | i | i + 4 | | | Fet_PC | icache_e | enable |
| not taken target | odd | | | Fet_PC + 2 | 0 | | | |
| taken target | even | | | | 0 | | | |
| | odd | i | i + 4 | target | 1 | | | |
| 32-bit branch | odd | | | | | | | |
| 64-bit shadow | even | i | i + 4 | | | Fet_PC | icache_e | enable |
| not taken target | even | | | Fet_PC + 2 | 0 | | | |
| taken target | even | | | | 0 | | | |
| | odd | i | i + 4 | target | 1 | | | |
| 64-bit branch | even | | | | | | | |
| 32-bit shadow | even | i | i + 8 | | | Fet_PC | icache_e | enable |
| not taken target | odd | | | Fet_PC + 2 | 0 | | | |
| taken target | even | | | | 0 | | | |
| | odd | i | i + 8 | target | 1 | | | |
| 64-bit branch | even | | | | | | | |
| 64-bit shadow | even | i | i + 8 | | | Fet_PC | icache_e | enable |
| not taken target | even | | | Fet_PC + 2 | 0 | | | |
| taken target | even | | | . | 0 | | | |
| | odd | i | i + 8 | target | 1 | | | |

*Assumes Fetch_PC is 'not' a branch target

TABLE 4

| | Branch Target Fetch Requirements: | | |
|---|---|---|---|
| Fetch PC | LW Alignment | Next IR | Fetch Request |
| Branch Target | even | icache_e | enable |
| | odd | icache_o | enable |
| Sequential | | (see above tables) | |

The below state equations define prefetch control functionality.

```
FUNCTION next_IP_PC(2) : boolean;
BEGIN
    IF dec.taken_branch
        THEN next_IP_PC(2) := PCSRC(2)
        ELSE next_IP_PC(2) := false;
END;
FUNCTION next_if.taken_branch : boolean;
BEGIN
    IF dec.taken_branch
        THEN next_if.taken_branch := true
        ELSE next_if.taken_branch := false;
END;
FUNCTION IP_PREIR_sel : boolean;
BEGIN
    IF (-(dec.f) & -(dec_PC(2)) & -(if.taken_branch)
        THEN IP_PREIR_sei := true
        ELSE IP_PREIR_sei := false;
END;
PROCEDURE DEC_PC.assign;
BEGIN
    IF IP_PREIR_sei
        THEN next_DEC_PC := Dec_PC + 1
        ELSE next_DEC_PC := Fetch_PC;
END;
PROCEDURE state_transition;
BEGIN
IF -fetch_stall & -exec_stall
THEN
    BEGIN
        IP_PC(2) := next_IP_PC(2);
```

TABLE 4-continued

```
        DEC_PC := next_DEC_PC;
        if.taken_branch := next_if.taken_branch;
ELSE
    BEGIN
        IP_PC(2) := IP_PC(2);
        DEC_PC := DEC_PC;
        if.taken_branch := if.taken_branch;
    END;
PROCEDURE assign_prefetch_controls;
BEGIN
    IF MMU_PCSRC_Busy
        THEN
            BEGIN
                PC(2) := MMU_PC(2);
                PREIR_sei := MMU_PREIR_sei;
            END;
        ELSE
            BEGIN
                PC(2) := IP_PC(2);
                PREIR_sei := IP_PREIR_sei;
            END;
END;
```

The pre-fetch instruction register select control signals 68 is provided by the integer processor 66 network for selecting the pre-fetch register 70 as the source of the next instruction to be loaded into the integer processor instruction register 102. The program counter bit 2 provides control from the integer processor 66 for selecting the odd longword of the instruction cache as the next instruction to be loaded into the integer processor's instruction register. The pre-fetch instruction register control is illustrated by the state equations as expressed in pseudocode given in Table 4, above.

The integer processor 66 and the floating point processor 62 each include a decoder/controller section 65 and 63, respectively, wherein the received instruction word is decoded.

Figure 3:
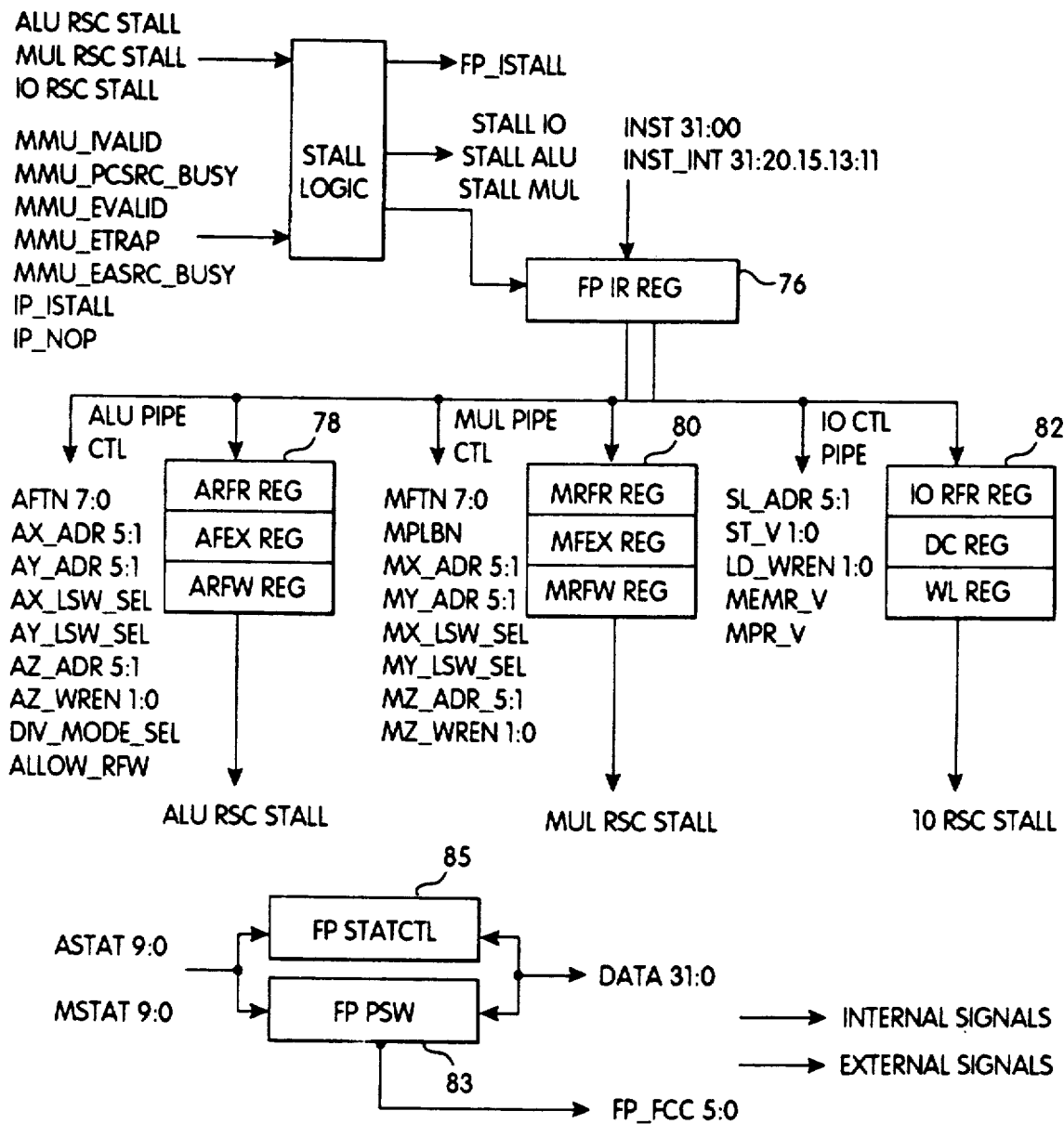
FIG. 3 is a chart indicating the instruction flow through the floating point processor, also including signals from the integer processor instruction stream.

In one embodiment of the present invention, the floating point processor 62 also stores instruction signals provided by the multiplexer 64 with regard to FIG. 3, the floating point processor 62 includes an instruction register 76, which receives the signals INST 31:00 from the odd portion 58 of the instruction cache 54, wherein the floating point instructions are then forwarded to the arithmetic registers 78 and the multiplier registers 80, according to the design of the floating point processor. The floating point instruction register 76 also receives the INST INT 31:20, 15, 13:11 instruction signals from the even portion of the instruction cache 54 through the multiplexer 64, wherein the storage signals are received by the input output (I/0) control pipeline registers 82. The I/0 control signals are then used for controlling of data transfers between memory and the floating point unit registers.

The floating point instruction register 76 also receives signals from a stall logic unit 75.

Other modifications and substitutions made by one of ordinary skill in the art according to the teachings of the present invention are considered to be within the scope of the present invention which is not to be limited except by the claims which follow.

Result status, ASTAT 9:0 and MSTAT 9:0, from the floating point arithmetic and logic unit (ALU) (not shown) and the floating point multiplier (MUL) (not shown) respectively, is returned to the floating point control chip (FPC) included in the floating point processor 62 where the result status is used to update bits in a processor status word (PSW) stored in FP PSW register 83, and is used to update a status control register FP STATCTL 85.

What is claimed is:

1. Apparatus for concurrent dispatch of instructions to multiple functional units, said apparatus comprising:
    means for providing an instruction word that includes at least one portion selected from the group consisting of integer instructions and floating point instructions;
    an instruction, cache for receiving said instruction word including an integer instruction area for delivering an instruction directly to an integer processor and a floating point instruction area for delivering an instruction directly to a floating point processor;
    an integer processor for receiving an integer instruction from said instruction cache, and for processing data provided to said integer processor; and
    a floating point processor for receiving a floating point instruction from said instruction cache, said floating point instruction being received simultaneously with the receipt of said integer instruction by said integer processor, for processing data provided to said floating point processor,
    wherein said means for providing includes:
    a program counter register with a high order portion that indexes cache lines within said instruction cache, and a low order portion that identifies an appropriate starting point for each instruction within each cache line; and
    means for incrementing said high order portion of said program counter of said cache, said means for incrementing being ignored by said high order portion of said program counter upon a transfer of an instruction from said pre-fetch register to a receiving processor.

2. The apparatus of claim 1 further including:
    pre-fetch register means for receiving and storing an integer instruction from a floating point instruction area of said cache, and subsequently transferring said integer instruction to said integer processor, after said integer processor has received an integer instruction from the integer instruction area of said cache.

3. The apparatus of claim 1, further including:
    means for providing an integer instruction to said integer processor, irrespective of where said integer instruction is stored within said instruction cache.

4. The apparatus of claim 1, further including:
    multiplexer means for selectively providing an instruction to one of said integer and floating point processors from one of said integer and floating point instruction areas.

5. The apparatus of claim 4, wherein
    a decode and control unit of said integer processor provides condition code and instruction code decode signals in response to the received integer instruction, and
    said multiplexer means is responsive to said condition code and instruction code decode signals by selecting an instruction from said integer instruction area and said floating point instruction area.

6. The apparatus of claim 5, wherein
    said first processor comprises a pipeline processor including means for providing a program counter signal to a program counter and to said multiplexer means.

7. The apparatus of claim 6 wherein
    said means for providing a program counter signal selectively increments said program counter by a number of addressable locations in memory chosen from a group of address incrementation options consisting of:
    zero (said program counter is not incremented),
    a memory address incrementation for addressing a next instruction, and
    a memory address incrementation for addressing a next instruction word.

8. The apparatus of claim 7 wherein
    said instruction word includes 64 instruction bits comprising 8 bytes of 8 bits per byte;
    said integer and floating point instructions comprise 4 bytes of 8 bits per byte;
    said multiplexer means includes means for addressing each instruction word byte;
    said memory address incrementation for addressing said next instruction is 4 addressable memory locations; and
    said memory address incrementation for addressing said next instruction word is 8 addressable memory locations.

9. The apparatus of claim 7, further including
    pre-fetch register means for receiving an integer instruction from said instruction cache, and for providing said integer instruction to said integer processor when said program counter is not incremented.

10. The apparatus of claim 9, wherein
    said integer processor further includes branch means connected to said decode and control unit, and responsive to said instruction code decode and said condition code signals for providing a branch signal to said means for providing a program counter signal, wherein
said branch signal is an integer multiple of said memory address incrementation for addressing a next instruction.

* * * * *